United States Patent [19]

Loose

[11] Patent Number: 4,527,243
[45] Date of Patent: Jul. 2, 1985

[54] CROP SHEAR CONTROL

[76] Inventor: Peter W. Loose, 11 Longstomps Ave., Chelmsford, England

[21] Appl. No.: 389,237

[22] Filed: Jun. 17, 1982

[30] Foreign Application Priority Data

Jun. 19, 1981 [GB] United Kingdom ................ 8118912
Nov. 20, 1981 [GB] United Kingdom ................ 8135096

[51] Int. Cl.³ ........................ G06F 15/46; B21B 37/00
[52] U.S. Cl. ........................................ 364/469; 72/11;
72/203; 250/560; 358/101; 358/107; 364/472;
364/475
[58] Field of Search ............... 364/472, 474, 475, 469;
72/8–11, 31, 37, 203, 204; 358/101, 105, 107,
139, 160, 903; 250/561, 560

[56] References Cited

U.S. PATENT DOCUMENTS

| | | | |
|---|---|---|---|
| 3,538,726 | 11/1970 | Cook | 72/203 X |
| 4,033,885 | 7/1977 | Stone et al. | 378/149 X |
| 4,139,890 | 2/1979 | Yerkes et al. | 72/37 X |
| 4,176,535 | 12/1979 | Elsner | 72/203 X |
| 4,379,395 | 4/1983 | Konishi et al. | 364/472 X |
| 4,384,303 | 5/1983 | Brenke et al. | 358/101 X |

Primary Examiner—Joseph Ruggiero
Attorney, Agent, or Firm—Lerner, David, Littenberg, Krumholz & Mentlik

[57] ABSTRACT

The invention relates to electronic control of a crop shear for trimming the head and tail of a bar. The bar is scanned longitudinally by a camera to monitor its progress towards the crop shear. The bar is also scanned transversely by a second camera connected to a processor which analyses the shape of the bar to determine the optimum point for cropping. The method is also described for distinguishing between the outline of a bar and surface anomalies such as may be caused by water or scale on the bar.

11 Claims, 12 Drawing Figures

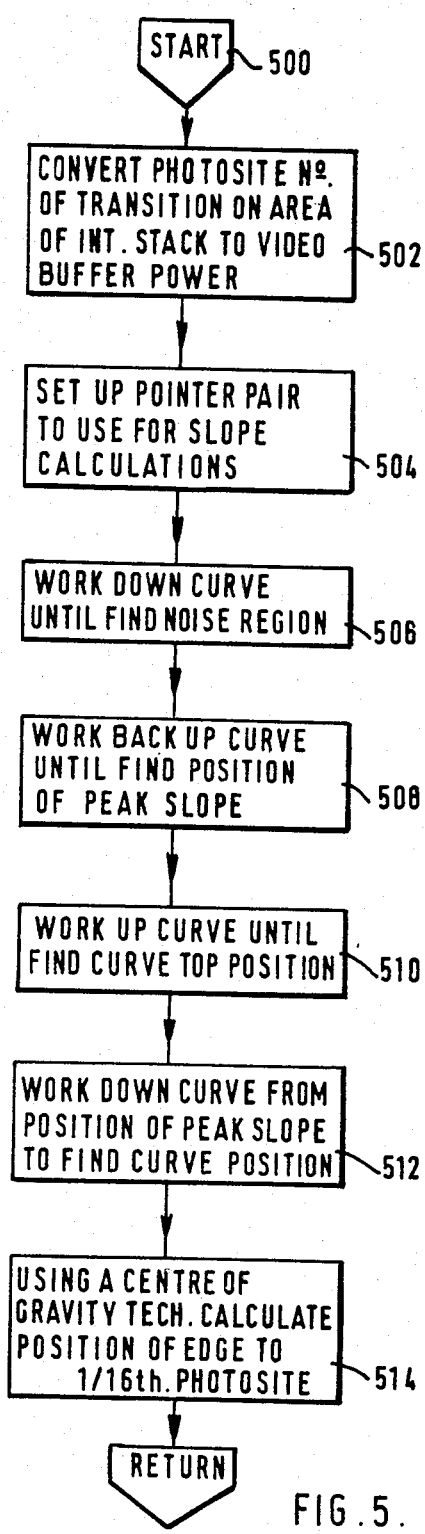
FIG.5.
FIG.8
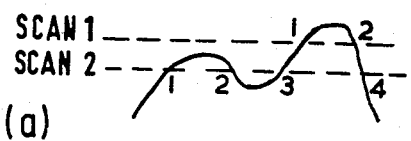
(a)
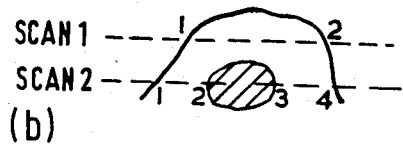
(b)
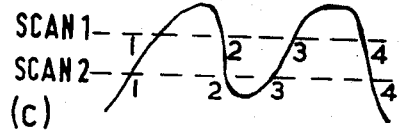
(c)
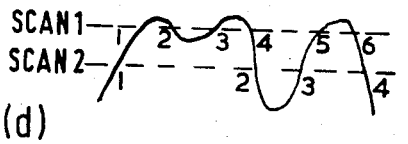
(d)
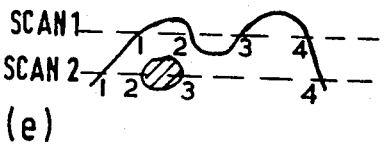
(e)

CROP SHEAR CONTROL

BACKGROUND OF THE PRESENT INVENTION

The present invention relates to the control of a rotary crop shear in a hot strip mill.

In a hot strip mill, the roughing stands reduce hot slabs to a thickness and width appropriate to finishing mill requirements. This results in a bar, the ends of which are deformed from the ideal shape, for presentation to the input of the finishing mill. When viewed in plan, the front ends may be pointed or rounded, while the tail end is scalloped or fish tailed.

In order to present bars correctly for finishing, some form of crop shear is employed to trim the heads and tails to approximately square plan. This results in a loss of yield and it is desirable with a view to minimizing costs and wastage to crop at the optimum point.

Failure to present a square head end results in poor threading of the finishing mill with associated high risk of cobbles. Equally, difficulties on the run out table and at the coiler occur due to the very pointed shapes which easily catch and lead later to cobbles. At the tail end, the expanding fish tail develops into long fingers which brake off and damage finishing rollers. In some cases the ends broken off are left in the mill endangering subsequent threading.

According to standard mill practice, the head may either be cut with the bar stationary or on the fly. Clearly, static crop is easier to control since one can visually decide upon a minimum loss crop point, say where the bar width has reached a high proportion of average width. Under operator control, the bar is progressively presented to the crop shear until the operator is satisfied with the cut.

Where the practice is to cut on the fly, the operation is much less accurate as the operator has to predict the arrival of the desired bar cutting point at the crop shear which is itself subject to delay in starting up.

The tail end cut, on the other hand, must always be effected on the fly because the head of the bar is now in the finishing mill and will probably be at the coiler so that the bar speed at the tail end is controlled by the input stand of the finishing mill. To be safe, mill operators have tried to cut off more tail than is required rather than suffer the costs of cobbles and roll wear, which result in mill down times.

There has been previously proposed in British Patent Specification No. 1,575,901 to monitor the progress of the bar to determine its speed at a predetermined trigger point and to commence the operation of the flying crop shear such as to cut off a predetermined length from the head or tail of the bar.

This system has the disadvantage that the amount cut off is always fixed whereas the optimum amount to be cropped is not constant but varies from one bar to the next. Thus, in deciding upon a predetermined length to cut off, it is necessary to allow for the worst case, and this often results in a substantial wastage.

SUMMARY OF THE INVENTION

The present invention seeks to provide a method and an apparatus for controlling a flying crop shear in such a manner as to minimize wastage.

In accordance with a first aspect of the present invention, there is provided an apparatus for controlling a flying crop shear, comprising electronic camera means positioned to view the bar to be cropped, means for analysing first video data derived from scanning the bar, at least at the ends to be cropped, transversely to the direction of motion of the bar to determine a desired point of crop dependent upon the shape of the end of the bar, means for analysing second video data derived from scanning the bar in the direction of motion to determine the speed and position of the bar relative to the crop shear, and means for controlling the motion of the crop shear in such a manner that cropping occurs at the desired point.

It is standard practice to control the speed of the crop shear at the instant of cutting in such a manner as to assist in the separation of the cut-off portion from the remainder of the bar, and, in the preferred embodiment of the present invention, the speed of the crop shear is also controlled in this manner.

As compared with the above prior art specification, the invention offers two advantages. The first is that the point of crop is not predetermined for all bars but is decided for each bar in dependence upon its shape, so as to minimize wastage for each bar. Secondly, in the prior art the crop shear was released when the head of the bar reached a predetermined trigger point and consequently if the bar were accelerating or decelerating in its movement towards the crop shear the point of crop would differ from the desired point. In the present invention, there is no trigger point, as such; instead an expected time of arrival of the desired point of crop at the crop shear is constantly evaluated and the motion of the flying crop shear is adjusted accordingly. Conveniently, the monitoring of the forward motion of the bar continues to take place up to a point at or near the mouth of the flying crop shear.

In accordance with a second aspect of the present invention, there is provided a method of controlling a flying crop shear which comprises optically scanning across the width of a bar to determine a desired point of crop dependent upon the shape of the head or tail of a bar, optically scanning the bar parallel to the direction of motion to monitor progress of the bar towards the crop shear and controlling the motion of the crop shear in dependence upon the position and speed of the desired point of crop in such a manner that the bar is cut by the flying crop shear at the desired point.

BRIEF DESCRIPTION OF THE DRAWINGS

The invention will now be described further, by way of example, with reference to the accompanying drawings, in which:

FIG. 5 is a flow chart indicating the manner in which the position of the head of a bar is determined to an accuracy better than one inter-element spacing, FIGS. 8a to 8e are schematic outlines of a bar which will be used in explaining the flow chart of FIG. 7.

DESCRIPTION OF THE PREFERRED EMBODIMENT

Figure 1:
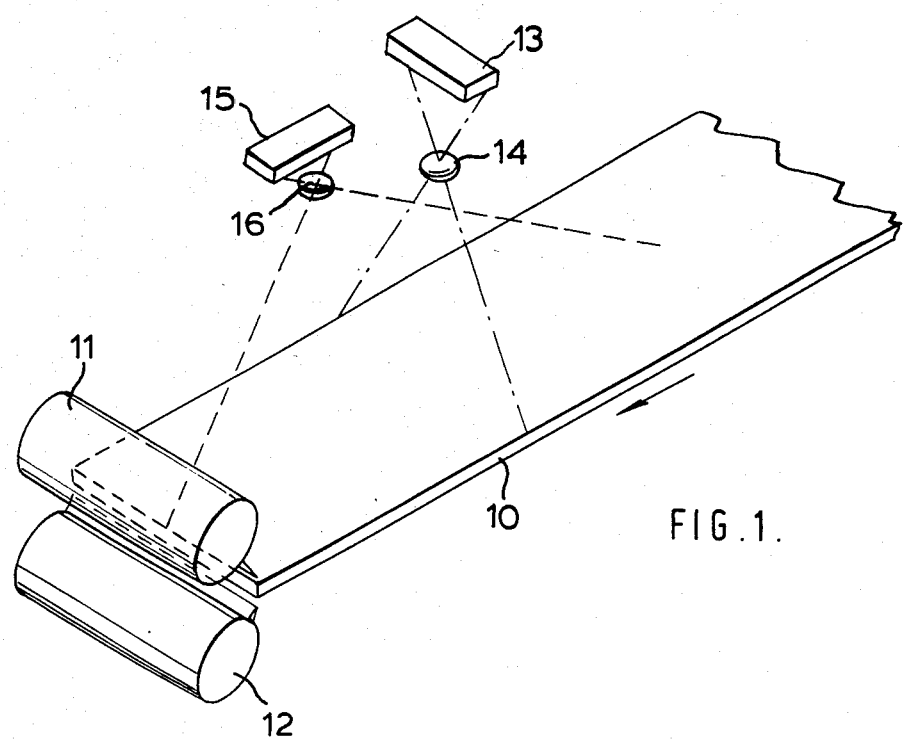
FIG. 1 is a schematic representation of apparatus for controlling a flying crop shear.

In FIG. 1, there is shown schematically a bar 10 moving towards a crop shear 11, 12. At this point, the bar 10 has already passed through the roughing stands and typically its front end is tapered and its tail end is fish tailed. The bar 10 passes beneath an electronic camera which comprises a first charged coupled device 13, extending transversely of the direction of the bar, and an optical system 14. The width of the bar 10 is scanned by the charged couple device 13 which may be sensitive either to light in the visible spectrum or to infra-red radiation emitted by the hot bar 10. The width of the bar is repeatedly scanned as the bar moves under the camera.

The bar 10 also passes beneath another camera which comprises a charge couple device 15 and an optical system 16. The charge couple device 15 of the latter camera extends in a direction parallel to the direction of movement of the bar 10 and is connected to a processor which analyses the progress of the bar 10 towards the crop shear 11,12.

During operation, the charge couple device 15 senses when the head or tail end of a bar 10 is approaching the crop shear 11,12. When a head or tail end is in the field of view, the data derived from the charged couple device 13 by scanning the bar transversely is analysed to determine an optimum point of crop. The progress of the optimum point of crop towards the crop shear 11,12 is monitored by the longitudinal camera and the computer controls the motor of the crop shear 11 and 12 in such a manner that cropping occurs at the time of arrival of the point of crop. As is well known, the crop shear 11, 12 is controlled to have a forward speed component greater than that of the bar 10 when cropping the leading end and smaller than that of the bar when cropping the tail end, in order to assist in the separation of the cut-off portion and to avoid impeding progress of the bar 10.

The two charge coupled devices 13 and 15 constitute noncontacting speed and position sensing and are mounted typically twelve to fifteen feet above the bar 12. The charge coupled devices are mounted within a housing which protects them against the hostile environment in a mill and which is provided with water cooling. If necessary, the interior of the housing may additionally be air purged. The charge coupled device 15 effectively creates a ruler along the roller table centre line over a length of approximately 22 feet with a resolution approaching 0.1 inches. One end of this electronic ruler is in the mouth of the crop shear so that the system monitors the progress of the bar end up to the instant of crop. Consequently, the speed and the position of the bar are constantly updated to achieve the desired cut point with accuracy.

Crop shears used to cut bars are either controlled or uncontrolled. In uncontrolled crop shears, after power has been applied, the motor speeds up and is limited only by inertia and its motor power. A typical crop blade will travel fifty inches from initial application of power to the point of making a cut so that inconsistency of power/acceleration of say 10% will result in some five inches of variation of cut position.

On the other hand, in a controlled crop shear the acceleration profile and later position are included in a feedback loop which aids consistency of cut.

Where an existing installation is of the uncontrollable type, in order to perform the present invention control elements should be added in order to take advantage of the accurate determination of the bar speed and position.

The electronic parts of the crop shear control apparatus will be described below by reference to flow charts. The diamond shaped blocks represent decisions to be taken by comparing signals and have two output paths depending on the result of the comparison. The rectangular blocks, on the other hand, represent actions to be taken such as the setting of signal levels, arithmetic calculations, and the opening of gates and latches to control the movement of data.

In implementing the invention, each of the blocks may be considered as an item of hardware such as a comparator, a latch or an arithmetic unit, as the case may be, and it may alternatively be regarded as a program instruction for a programmable computer to perform the same operation. The only substantial difference between the two methods or implementation is that in the case of hardware implementation all the operations take place simultaneously whereas in the case of software implementation the computer performs the operations sequentially, whereupon care must be taken to allocate the right order of priorities to the operations performed. Though in the present invention, hard wired circuits may be employed throughout, it is preferred to employ a programmed micro-computer to perform such functions as can be carried out on a time sharing basis. It is believed that based on the flow charts and the description below, a person skilled in the art will readily be able to realise the invention.

Figure 2:
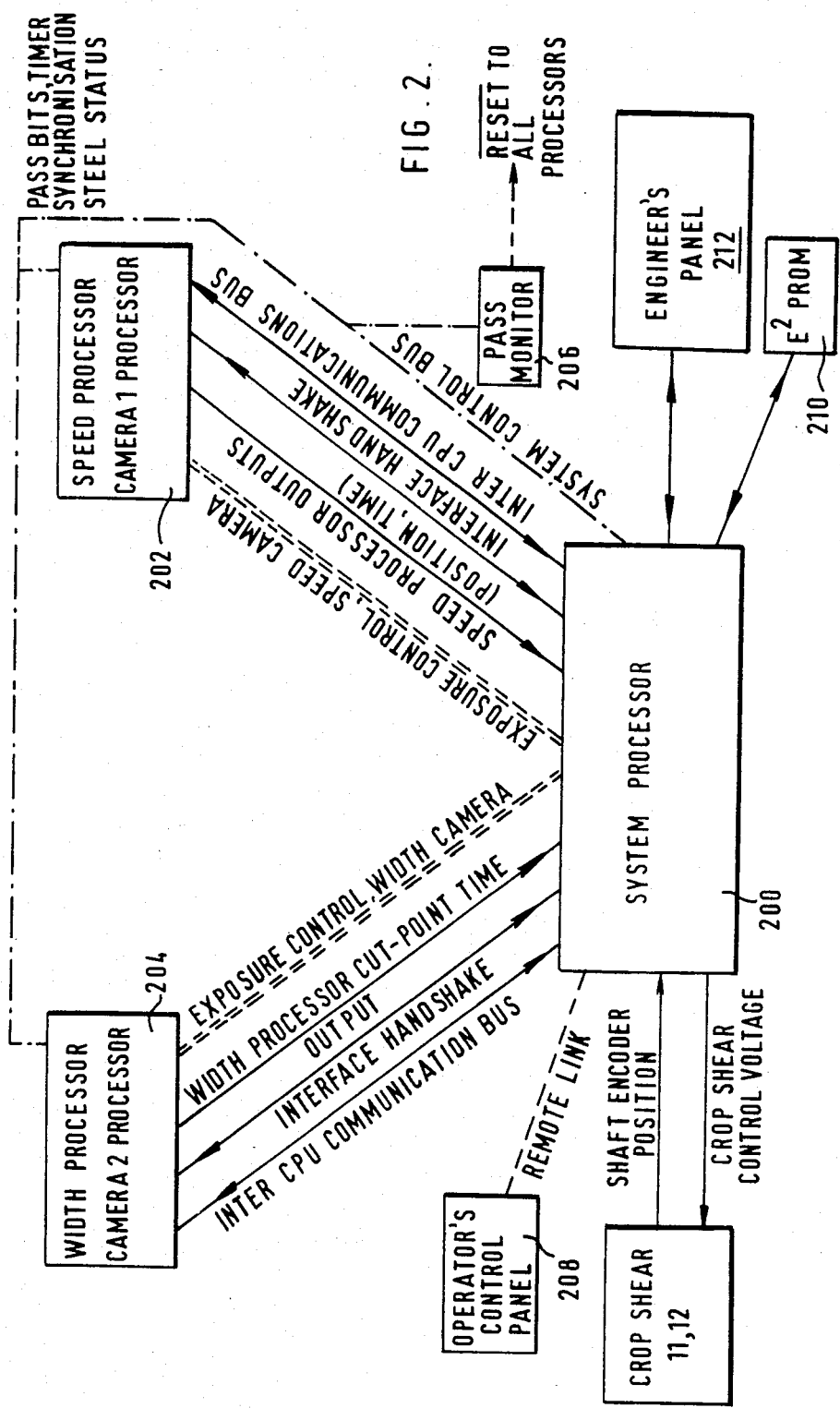
FIG. 2 is a system diagram showing the computer for controlling the flying crop shear.

FIG. 2 shows a system diagram of the computer for controlling the flying crop shear. The computer comprises a system processor 200, a speed processor 202 which is connected to the camera having its CCD array extending parallel to the direction of movement which will herein after be termed camera 1 and further connected to a width processor 204 associated with the other camera which will herein after be termed camera 2. The various buses and lines connecting the system processor 200 to the speed processor 202 and the width processor 204 have been labelled in FIG. 2 and these will be clear without much further explanation.

The exposure control of both cameras is effected under control from the system processor 200. Exposure control is effected by varying the scanning frequency which determines the time over which each element of the CCD array integrates light from the field of view. This is equivalent to controlling the shutter speed in a conventional camera. The exposure is controlled in such a manner that the peak video output in a scan should not exceed 80% of the saturation value.

The speed processor 202 evaluates the position of a bar and transmits a position and time signal to the system processor 200. The latter also receives from the width processor 204 the desired cut point and the time output. All three processors are synchronized, whereby the system processor has available information relating to the desired point of crop at any given time. The system processor 200 also receives data regarding the position of the crop shear 11, 12 from a shaft encoder associated with the crop shear. The processor 200 also provides output control voltage which regulates the speed of the crop shear motor.

The pass monitor 206 is a conventional item of hardware for resetting all the processors under certain circumstances and need not be described in detail within the context of the present invention. The engineer's panel 212 is provided for the purpose of enabling an installation engineer to set the parameters appropriate to a particular mill such as the magnification of the camera, the distance between the cameras and the crop shear, etc. This data is stored in an electrically erasable programmable read only memory 210 which is also connected to the system processor 200.

Finally, a control panel 208 for an operator is connected by a remote link to the system processor to enable operator entry of information into the processor, but such a panel is not essential.

From FIG. 2, it will be appreciated that the purpose of the speed processor is to determine the position and speed of the bar while the width processor is to analyse the shape of a bar to determine the desired point of crop. These two processors feed their outputs into the system processor 200 which then controls the crop shear 11, 12 based on the information derived from the processors 202 and 204 and other fixed parameters entered either by means of the engineer's panel 212 or the operator's control panel 208.

Figure 3:
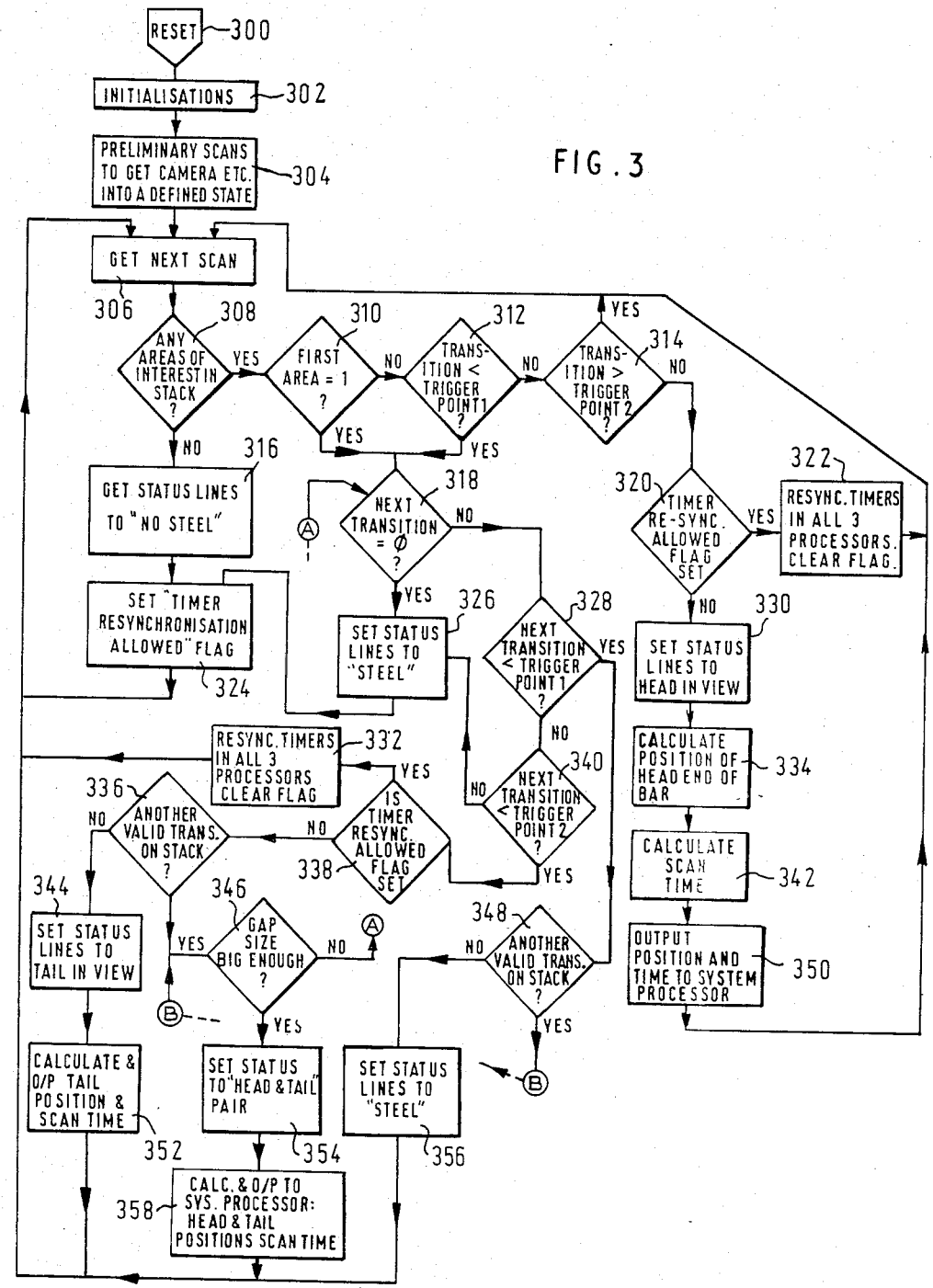
FIG. 3 is a flow chart to describe the operation of the speed processor of FIG. 1.

FIG. 3 is a flow chart for the speed processor 202. The video data from each scan of the speed processor is entered into a stack for analysis to determine if within the stack there are any areas of interest. An area is defined as being of interest if it contains a crossing of a predetermined threshold which is likely to indicate a transition caused by the head or tail of a bar. Such transitions are not always ends of a bar, but can be caused by water droplets, scale and the like on the surface of the bar. The threshold for the stack is set normally at 25% of the peak corrected video for the previous scan. The exact percentage can be adjusted by communication from the system processor 200 through the interprocessor communication bus. There is always a zero at the end of the stack and the presence of steel at the start of an array is indicated by a binary "1".

It is only possible to obtain an accurate measurement of an edge if the complete curve associated with the edge lies within the field of view. For this reason, transitions that occur near the ends of the array should be ignored and reference is made below to two trigger points, these being the elements bounding the active area of the CCD array and beyond which transitions are disregarded.

The primary function of the operations in the flow chart are to identify the head or tail position of a bar and to initiate synchronization of the timers in all three processors once a point of crop has been identified. The processor also sets a status line which indicates whether steel, a head, a tail or a head and tail pair lie within the field of view.

In FIG. 3, at the start the whole processor is reset in block 300 following which the system is initialised (block 302) and in block 304 preliminary scans are taken to get the camera and the rest of the system into a defined state. Next, in block 306, a scan is gated to a decision block 308 where it is decided if there are any areas of interest in the stack. Assuming there are no such areas, the chart proceeds to block 316 where the status line is set to indicate that there is no steel present and a flag is set in block 324 to indicate that timer resynchronization is permitted. A further scan is then gated for analysis.

If an area of interest is present, the output from block 308 will lead to block 310 in which it is determined if the first element is at a binary "1" state (steel present). If the first element indicates that no steel is present, a further decision is taken to block 312 to determine if the first transition occured before the first trigger point. A positive answer derived from either of blocks 310 and 312 is treated in the same manner and there follows a decision in block 318 to determine if the next transition is a return to zero. If the answer to the latter question is positive, this indicates that steel is present throughout the scan and therefore the status line is set to "steel" in block 326, timer resynchronization is allowed by the flag in block 324 and a new scan is gated for analysis.

If the next transition in block 318 is not a return to zero (end of array), then in block 328 the next transition is analysed to determine if it occurs before the first trigger point. If it does not occur before the first trigger point a decision is next taken in block 340 to determine if the transition took place before the second trigger point. If the last decision yields a positive answer, this indicates that steel is present at the commencement of the array, but that the signal returns to zero somewhere between the two trigger points. That is to say, the tail of a bar is within the field of view.

When a tail first comes into the field of view it is necessary to resynchronize all the timers in the processors and the timing is retained until cropping takes place. Once a tail or head has been sighted for the first time, the timers are resynchronized and a flag is set up to prevent resynchronization until after that head or tail has been cropped. Therefore, the tail present signal from the block 340 is applied to a block 338 in which it is determined if the flag permitting resynchronization has been previously set. If resynchronization is allowed, then this is done in block 332 and the next scan is analysed. If resynchronization is not permitted then a further decision in block 336 is made to determine if there are any other valid transitions on the stack. Assuming there are not, the status line is set to "tail in view" in block 344 and in block 352 the position of the tail is calculated and outputed together with the scan time. The next scan is then gated for analysis.

If in block 336 it is found that there is another transition on the stack, a further decision is taken in block 346 to establish if the gap size is sufficiently large. If there is a sufficiently large gap, then this indicates that the tail is indeed present in the field of view but that there is also the head of a following bar. The status line is therefore set in block 354 to indicate the presence of a head and tail pair and prior to gating a new scan the processor calculates and outputs to the system processor 200 the positions of the head and tail of the bars in the field of view as well as the scan time (block 358). If in block 346 it is decided that the gap size is not sufficiently large, then the two transitions are probably caused by water or scale on the surface of the steel and should be disregarded, whereupon the chart returns to block 318 to analyse the next transition, thereby disregarding the two transitions which are too close to each other.

Returning now to the block 328, if the next transition occurs before the first trigger point then in block 348 it is established whether there is another valid transition on the stack. If there is, then this is a head and tail pair and the path followed is once again through blocks 346, 354 and 358. If on the other hand there is no other transition then, proceeding to block 356, the status line is set to indicate that steel is still present but the position of the tail is not calculated and the next scan is gated for another analysis.

If in block 312 it is determined that the first transition occured after the first trigger point, then it is decided in block 314 if it occured after the second trigger point. If the answer is positive then the head end of a bar is just approaching the field of view but has not yet entered the active area of the array. The information is therefore disregarded until the next scan when more of the bar can be seen. On the other hand, if the head end is between the two trigger points then, as occured with the tail end, a decision is taken (block 320) to determine if timing resynchronization is allowed. If it is, then block 322 duplicates block 332 and resynchronizes the times in all three processors and also clears the flag in order to prevent further resynchronization. If the same head end has previously been recorded, then the flag will already have been cleared whereupon in block 330 the status line is set to indicate that a head is in view, the position of the head of the bar is calculated in block 334, the scan time is calculated in block 342 and prior to retrieving a new scan the calculated position and time are sent to the system processor in block 350.

Figure 4:
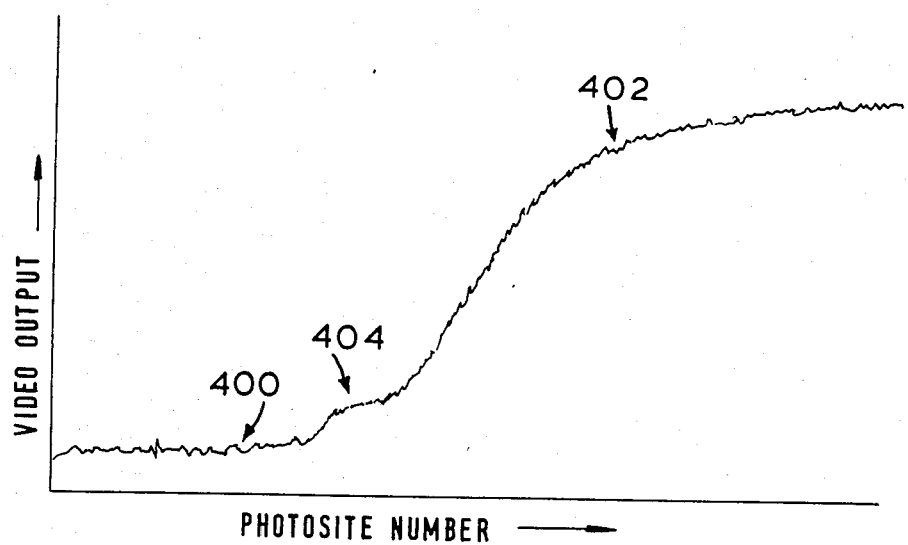
FIG. 4 shows a video scan at the head of a bar.

FIG. 4 shows a video scan, often encountered in practice, from which it is desired to locate accurately the position of the edge. The desired position lies somewhere between the noise region 400 and the top of the curve 402. Difficulty in locating the edge with accuracy, however, is presented by the step generally designated 404.

To calculate the bar end position with accuracy despite the step shown in FIG. 4, the flow chart of FIG. 5 is adopted. The principle of this flow chart is that the edge occurs near the section of the video scan of greatest slope and to determine this point accurately the element at which the largest gradient occurs is determined, then on each side of this element one determines the top and bottom of the curve these being elements where the slope drops to a predetermined fraction of its maximum value. The centre of gravity of the curve is then determined to arrive at the point of greatest slope with an accuracy better than one inter-element spacing.

In FIG. 5, after the start (block 500), the photosite number at which the transition occured on the area of interest is converted to the video buffer (block 502). The computer does not have sufficient capacity to store the whole of the scan with accuracy and this enables only the area of interest to be stored for detailed analysis.

In block 504 a pointer pair is set up to be used in slope calculations. By this it is meant that the video outputs at two spaced points are subtracted from one another to evaluate the slope between the pointers and these pointers are gradually moved up and down the curve. At first (block 506), the pointers are moved down the curve until the noise region is found. This may, for example, be assessed by integrating the slope over several readings. In the noise region the average slope will be substantially zero so that when the intregal of the slope falls below a threshold it is known that the signal consists mainly of noise. Having located the noise region, the pointers are moved up the slope in block 508 until the position of peak slope is found. This is determined, for example, by successive comparisons. The pointers, in block 510, continue to work up the curve until the curve top 402 is located. The pointers are then moved back down the slope in block 512 to find the bottom of the curve. Finally, using a centre of gravity technique, the position of the edge is calculated in block 514 from the values of slope between the bottom and top of the curve to an accuracy of one sixteenth of a photosite.

If the photosite position is plotted along the X-axis and the video signal along the Y-axis, as in FIG. 4, then the position of the centre of gravity is given by the sum of the products of the position and the slope at all points between the curve top and bottom, divided by the sum of the slopes; the slopes being defined as the difference between the video signals measured at the positions of the pointers placed on each side of each element.

Figure 6:
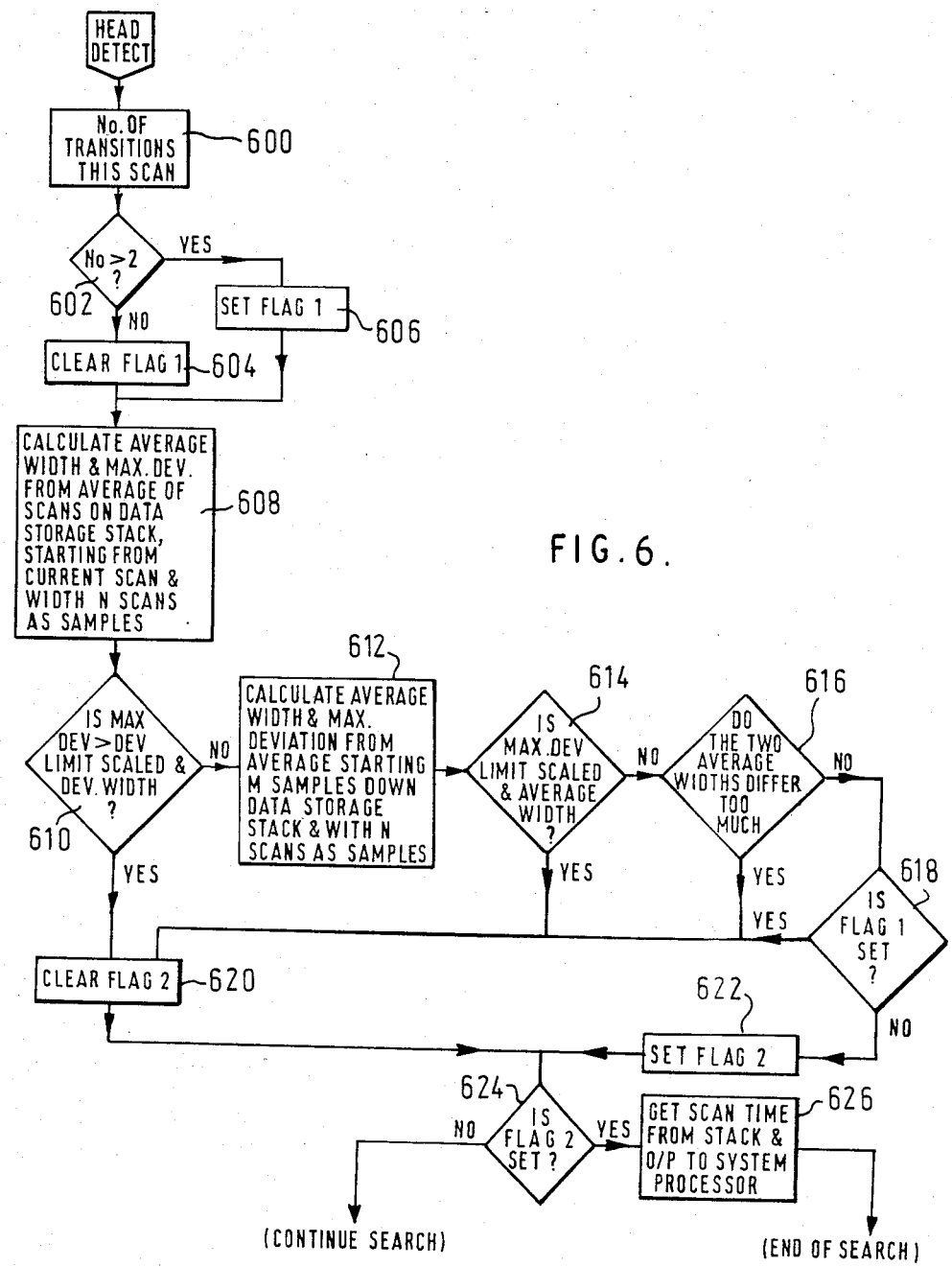
FIG. 6 is a flow chart to describe the algorithm employed in the width processor to detect the head and tail ends of a bar.
Figure 7:
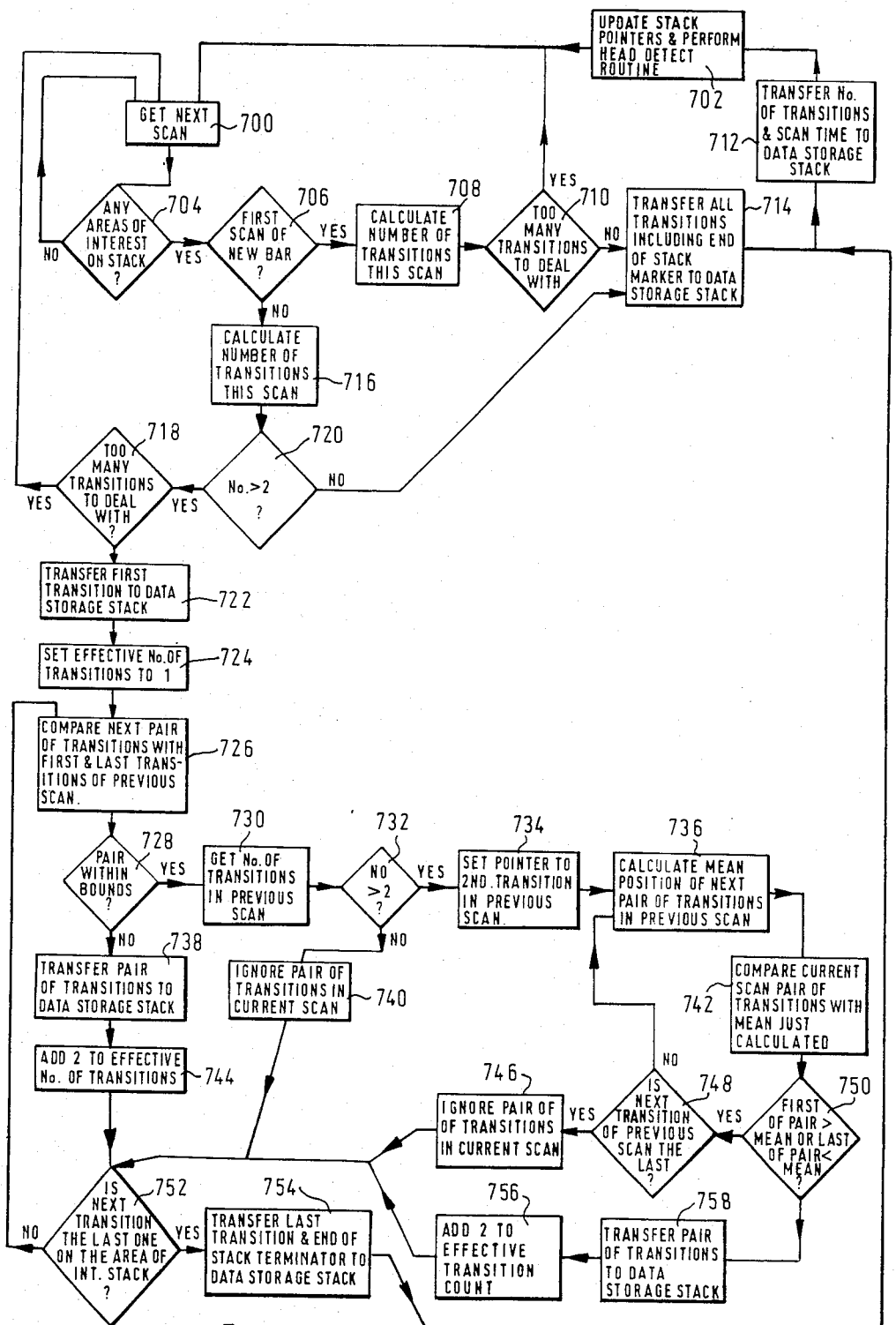
FIG. 7 is a second flow chart implemented by the width processor to calculate the desired point of crop.

FIGS. 6, 7 and 8 are concerned with the camera 2 processor. The flow chart of FIG. 6 is for the purpose of detecting a head and forms a part of the flow chart of FIG. 7 which is for the purpose of calculating the desired cutting point. FIG. 8 shows different plan views that may occur in practice at the head and tail end of a bar of steel.

In FIG. 6, the number of transitions in a transverse scan are noted in block 600 and prior to the mathematical calculations which take place in block 608 a flag 1 is set or cleared by one or other of blocks 606 and 604 depending on whether the number of transitions, as determined in block 602, is greater than or less than two. Even if a scan has more than two transitions, it is analysed but at a later stage the status of the flag is examined and the scan is disregarded if there are more than two transitions.

In block 608, there is calculated the average width and the maximum deviation from the average width for a group of N scans (it is for this reason that scans with more than two transitions cannot be disregarded earlier). Three tests are then made to determine if this is a valid scan. First, in block 610 it is determined if permissible limits of width and deviation are exceeded. If they are, then a second flag 2 is cleared in block 620. If the width and deviation are within the prescribed limits then a further measurement is made in block 612 to evaluate the average width and deviation for a group of N scans taken M samples later. Once again, in block 614, the average width and the maximum deviation in the second set of samples are calculated. If it is found that the maximum deviation or the average width have varied outside permissible limits, then the flag 2 is cleared by block 620 but if not the last test (carried out in block 616) is to evaluate if the two values of deviation and of average width differ excessively from one another. If they do then flag 2 is cleared in block 620, but if they do not then flag 2 is set in block 622 after first confirming in block 618 that flag 1 has not previously been set.

In block 624, depending on whether flag 2 has been set, the search is either continued or else in block 626 the search is terminated and the processor transmits to the system processor the scan time from the stack.

In FIG. 7, a first scan is gated by block 700 and a decision is taken to determine if there are any areas of interest on the stack (block 704). If there are not, then the next scan is analysed but if there are then it is assessed in block 706 whether this is the first scan of a new bar. If it is the first scan, then in block 708 the number of transitions is calculated and if it is determined in block 710 that there are too many to be analysed then the scan is ignored and the next scan is analysed. If the number of transitions can be analysed, then all the transitions are transferred in block 714 to a data storage stack including the end of stack marker. In block 712, the number of transitions and the scan time are transferred to the data storage stack and following this, in block 702, the stack pointers are updated and the head detect routine described by reference to FIG. 6 is performed. This loop is followed until the head detect routine detects the head of a bar.

On the next scan, the decision made in block 706 will result in a negative answer. The number of transitions in this scan are now calculated in block 716 and if there are no more than two, as determined in block 720, the flow chart returns to block 714 described previously. This is the straight forward case when there is no fish tailing and no water or scale on the head end.

If it is determined in block 720 that there are more than two transitions, it is next decided in block 718 if there are too many transitions to deal with. If there are, the scan is totally disregarded and the next scan is retrieved. If there are not then the first transition is transferred in block 722 to the data storage stack and an effective transition count is set to "1" in block in 724.

In block 726, the next pair of transitions are analysed to determine whether they fall between the first and last transitions of the previous scan. If they do not, then this is likely to correspond to the case shown in FIG. 8a where there is a fish tail, if they do then the case probably corresponds to that of FIG. 8b where the transitions 2, 3 are the result of water or scale (shown cross-hatched) on the steel. If it is determined in block 728 that the pair of transitions 2, 3 do not fall between the transitions 1, 2 of the first scan then, in block 738, the pair of transitions are transferred to the data storage stack as they signify the boundary of the steel. The effective transition count is then updated by adding "2" in block 744 and it is determined in block 752 if the next transition is the last one of the area of interest stack. If it is not, then the flow chart returns to block 726 to analyse the next pair of transitions in the same manner. If the next transition is the last on the stack, then in block 754 the last transition and the end of stack terminator are transferred to the data storage stack and the chart again returns to block 712.

Assuming that in decision block 728 it is found that the pair of transitions in the second scan fall within the bounds of the first and last transitions of the first scan, then in blocks 730 and 732 it is first determined if there are more than two transitions in the previous scan. If there are not, then the case is assumed to be that in FIG. 8b and in block 740 the pair of transitions is ignored and the flow chart returns to the previously described block 752. If, however, there are more than two transitions in the previous scan then in block 734 the pointer in the previous scan is set to the second transition and, proceeding to block 736, the mean position of the next pair of transitions in the previous scan is calculated. In block 742, the two transitions in the current scan are compared with the calculated mean. In block 750, it is assessed whether the first of the pair exceeds the mean or the last of the pair is less than the mean. If neither of these conditions is satisfied then the case corresponds to that shown in FIG. 8c whereupon the pair of transitions are transferred to the data storage stack in block 758 and after the effective transition count has been updated by the addition of "2" in block 756, the chart once again returns to block 752.

If the results of the comparison in block 750 is positive, then a further test is carried out in block 748 to determine if the next transition of the previous scan is the last. If it is the last, then this corresponds to the case shown in FIG. 8e in which the second and third transitions in the second scan are caused by water or scale. Consequently, in block 746, the transitions are disregarded and the chart again returns to block 752. If, on the other hand, it is determined in block 748 that there are further transitions in the first scan, then the chart returns to block 736 where the mean comparison is performed on the next pair of transitions in the first scan. This corresponds to the case shown in FIG. 8d, where there are six areas of interest in the first scan but only four in the second scan, as shown.

There has so far been described the operation of the processor in the case of a head approaching the crop shear. In the case of a tail end, scan data is stored on the data stack unfiltered until one gets to the end of the bar. The data is then filtered and the desired cut point calculated by a similar process to the head end, with the exception that the processor starts at the end of the bar and works backwards. The data storage stack therefore defines the outline of the steel disregarding any errors likely to be caused by droplets of water and this information is assessed to determine where the optimum point of crop occurs. The scan time corresponding to that line of crop is known and as all three processors are synchronized the system processor can now evaluate the expected time of arrival of the optimum point of crop at the crop shear.

In particular, the system processor will have a stream of position and time data pairs while the head end is in the active area of the field of view of camera 1 and from these, using classical mechanics, the speed at any point can be calculated from the data pairs. Furthermore, from this speed information and the position information, an estimated time of arrival at any desired point can be calculated.

It will be seen that there is constant updating of both the position and the time information enabling updating of the speed information. Consequently, the expected time of arrival may constantly be updated to take into account any acceleration or deceleration of the bar.

The system processor also receives data regarding the position of the flying crop shear and can also estimate its expected time arrival at the desired point of crop. The difference between the two expected times of arrival may be applied as a control voltage to regulate the speed of the motor of the flying crop shear.

I claim:

1. Apparatus for controlling a flying crop shear comprising,
    first electronic camera means positioned to scan in the direction of motion a moving bar to be cropped and to produce first video data in response to said scan,
    first means for analysing said first video data to determine the speed and position of said bar relative to said crop shear,
    means for controlling the motion of said crop shear to crop said bar at a desired point of crop,
    second electronic camera means positioned to scan the width of said bar and to produce second video data in response to said scan, and
    second means for analysing said second video data to determine said desired point of crop as a function of the shape of the end of said bar.

2. Apparatus according to claim 1, including means for establishing a threshold value for the first video data, said first means for analysing acting to determine each transition in value of said first video data with respect to said threshold value, said first means further acting to determine for each such transition a position at which a maximum rate of change of intensity of said first video data occurs to thereby detect the outline of said bar.

3. Apparatus according to claim 2, wherein each electronic camera means comprises an array of charge coupled elements, and said first means for analysing determining an element at which the rate of change of intensity is a maximum and the elements on each side of the latter element at which the rate of change of intensity drops to a predetermined fraction of its maximum value, said first means further determining the centre of gravity of the rate of change of intensity of the first video data between the two last mentioned elements to define the position of said maximum rate of change of intensity to an accuracy greater than one inter-element spacing.

4. Apparatus according to claim 1, wherein the first camera means has a scan field extending substantially up to the crop shear and the first means for analysing constantly updates position and speed data relating to the desired point of crop when the end of a bar lies within the scan field of said first camera.

5. Apparatus according to claim 1 including means for storing data representative of the edges of the bar, said second means for analysing comparing pairs of transitions with said stored data and distinguishing between impurities and an edge of the bar by ascertaining if the transitions occur within bounds set by the edges of the bar as determined in a previous scan.

6. Apparatus according to claim 5, including means for storing data representative of transitions within bounds established by the edges of the bar, said second means for analysing being operative to compare each pair of transitions within said bounds established by the edges of the bar in a scan with pairs of transitions within bounds set by the edges of the bar in the preceding scan to determine if the pairs of transitions in consecutive scans are substantially in alignment.

7. Apparatus according to claim 1, wherein said means for controlling the motion of the crop shear is operative to vary the speed of the crop shear as a function of the expected arrival time of the desired point of crop at the crop shear to cause cropping to occur at the desired point with the crop shear travelling at a speed calculated not to impede the motion of the bar.

8. Apparatus according to claim 1 including means for establishing predetermined limits, said second means for analysing determines when the detected width of the bar attains a stable value lying within said predetermined limits, said second means determining the desired point of crop in response to the width of the bar attaining a predetermined fraction of the stable width.

9. Crop shear apparatus comprising:
a pair of blades operative to meet at a predetermined position, a motor for driving the blades, a position transducer for sensing the position of the blades at spaced time intervals, first computing means responsive to the position transducer to evaluate from the position of the blades an expected time of arrival of the blades at said predetermined position, a first camera for scanning a bar to be cropped while approaching the crop shear, first processing means responsive to the first camera to determine the position of the edge of the bar at spaced time intervals, a second camera for scanning the width of the bar to be cropped, second processing means responsive to the second camera to determine a desired line of crop on the bar, second computing means responsive to the first and second processing means for ascertaining the expected time of arrival of the desired line of crop on the bar at said predetermined position from the sensed positions of the edge of the bar and third computing means for controlling said motor as a function of the difference between the said expected time of arrival of said blades and said expected time of arrival of said line of crop.

10. Apparatus according to claim 1 including means for establishing a threshold value for the second video data, said second means for analysing determining each transition in value of said second video data with respect to said threshold value to thereby detect the edges of the bar.

11. Apparatus according to claim 1 including means for determining an expected arrival time of the desired point of crop at the crop shear in response to the first and second means for analysing.

* * * * *

UNITED STATES PATENT AND TRADEMARK OFFICE
CERTIFICATE OF CORRECTION

PATENT NO. : 4,527,243
DATED : July 2, 1985
INVENTOR(S) : Loose

It is certified that error appears in the above-identified patent and that said Letters Patent is hereby corrected as shown below:

Column 6, line 3, delete "to", first occurrence and substitute thereof -- in --.

Column 11, line 24, delete "1" and substitute therefor --10--.

Column 11, line 41, delete "1" and substitute therefor --11--.

Column 12, line 3, delete "1" and substitute therefor --10--.

Signed and Sealed this

Fifteenth Day of October 1985

[SEAL]

Attest:

Attesting Officer

DONALD J. QUIGG

Commissioner of Patents and
Trademarks—Designate